United States Patent [19]
Schenk et al.

[11] Patent Number: 5,907,194
[45] Date of Patent: May 25, 1999

[54] DEVICE FOR SUPPLYING VOLTAGE IN A MOTOR VEHICLE INCLUDING TWO BATTERIES AND HAVING IMPROVED RELIABILITY

[75] Inventors: Joachim Schenk, Hemmingen; Dieter Schramm, Stuttgart; Richard Schoettle, Muehlacker, all of Germany

[73] Assignee: Robert Bosch GmbH, Stuttgart, Germany

[21] Appl. No.: 08/983,071
[22] PCT Filed: Mar. 25, 1997
[86] PCT No.: PCT/DE97/00605
  § 371 Date: Jan. 12, 1998
  § 102(e) Date: Jan. 12, 1998
[87] PCT Pub. No.: WO98/02333
  PCT Pub. Date: Jan. 22, 1998

[51] Int. Cl.[6] ............................................. B60L 22/00
[52] U.S. Cl. ...................... 307/10.1; 307/10.6; 180/65.1; 320/104; 364/528.21
[58] Field of Search ................................. 307/9.1, 10.1, 307/10.6, 10.7, 10.8, 66; 180/65.1–65.8; 320/103, 104, DIG. 30, DIG. 31; 340/438, 455; 364/528.21, 528.31, 528.32

[56] References Cited

U.S. PATENT DOCUMENTS 5,525,891  6/1996  Meyer et al. .

*Primary Examiner*—Richard T. Elms
*Assistant Examiner*—Jonathan S. Kaplan
*Attorney, Agent, or Firm*—Michael J. Striker

[57] ABSTRACT

A device for supplying voltage in a motor vehicle is described in which there is at least one generator that can furnish an generator-speed-dependent output voltage without voltage regulation. The at least one generator is preferably a three-phase alternator with a plurality of stator windings whose electrical connections are switchable at predetermined generator speeds by a control unit to provide the generator-speed dependent output voltage. In a following power control unit, this generator speed-dependent voltage is rectified by means of at least one controlled rectifier bridge and via assigned voltage converters is converted into a plurality of directly voltages of different magnitude. These direct voltages are supplied to the individual on-board electrical system components via electronic vehicle body power control system units. By optimal-efficiency triggering of the controlled rectifier bridges and additional safety and/or emergency provisions, the functional capability and power capability of the voltage supply unit are assured.

8 Claims, 1 Drawing Sheet

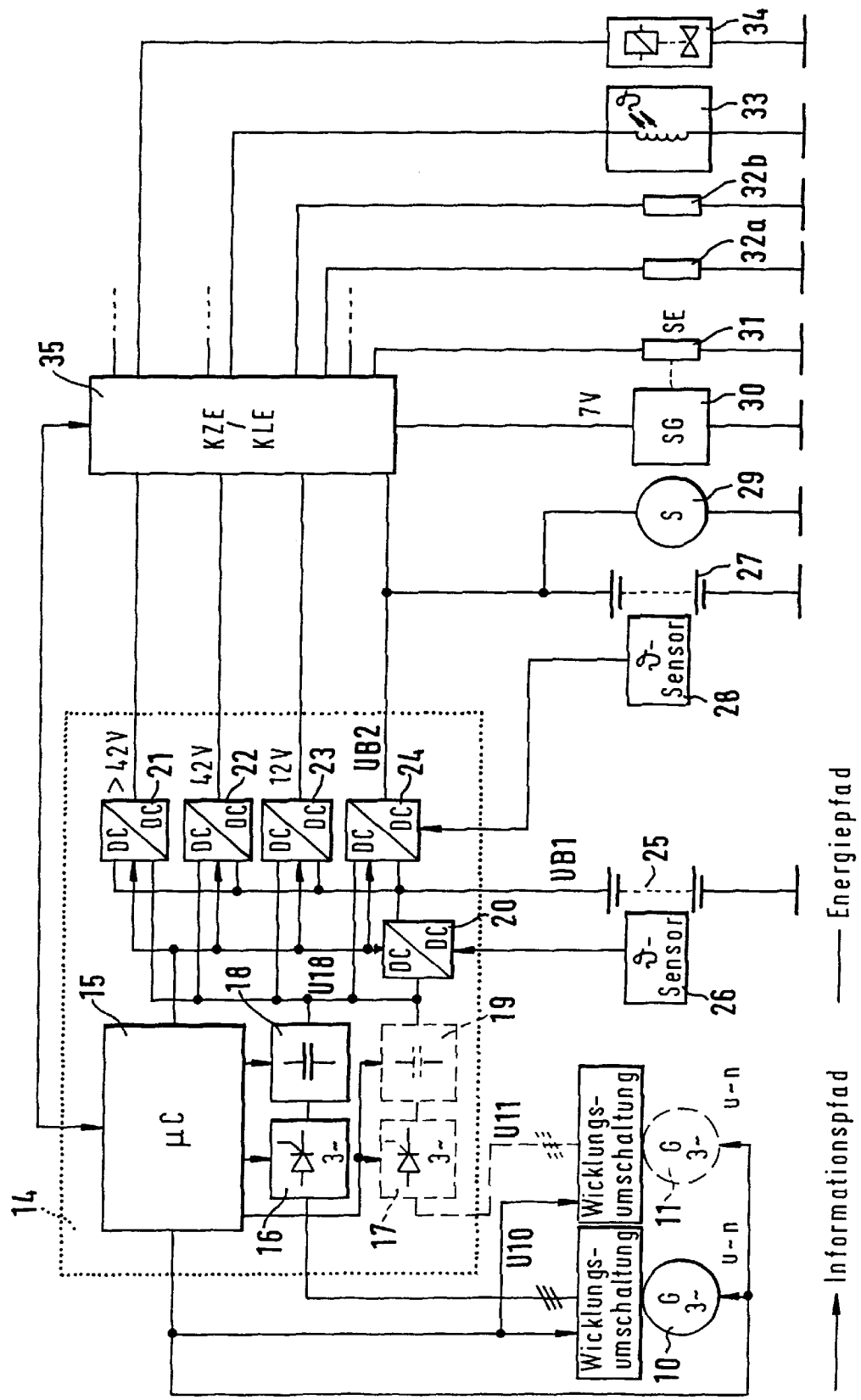

DEVICE FOR SUPPLYING VOLTAGE IN A MOTOR VEHICLE INCLUDING TWO BATTERIES AND HAVING IMPROVED RELIABILITY

BACKGROUND OF THE INVENTION

1. Field of the Invention

The invention relates to a device for the voltage supply in a motor vehicle and, more particularly, to a device for supplying voltage in a motor vehicle having two batteries.

2. Prior Art

Until now, the voltage supply in motor vehicles was typically done with the aid of a single battery charged by a generator. In modern motor vehicles with many electrical consumers, one battery is sometimes no longer sufficient for the voltage supply, and so two separate batteries are used that typically connected parallel to one another. To assure that the two batteries will not deleteriously affect one another, and thus to keep voltage drops that can occur during actuation of the starter away from voltage-critical components, a charging/disconnection module is connected between the two batteries, in a device for the voltage supply in a motor vehicle known from German Patent 41 38 943. During the starting process this module disconnects the battery connected with the starter from the rest of the on-board electrical system. Since the rated voltage of the battery connected to the starter is somewhat lower than the rated voltage of the on-board electrical system battery, it is assured that the starter battery will be optimally charged at all times. In one embodiment of the known device for the voltage supply in a motor vehicle, a voltage converter be used, for example a stepup device. It is thus possible to use a starter battery whose rated voltage is higher than that of the on-board electrical system battery. The charging voltage required for charging the starter battery can be obtained by increasing the voltage obtained from the on-board voltage.

SUMMARY OF THE INVENTION

The device for supplying voltage in a motor vehicle comprises:
- at least one generator including means for producing at least one generator-speed dependent output voltage without voltage regulation;
- at least two batteries;
- a plurality of electrical consumers;
- an electrically powered starter;
- a power control unit for operating the at least one generator without voltage regulation to produce the at least one generator speed dependent output voltage including controlled rectifier bridge means connected to the at least one generator, an intermediate voltage circuit connected to the controlled rectifier bridge means, means for controlling the at least one generator, the controlled rectifier bridge means and the intermediate voltage circuit and a plurality of terminals by means of which the at least two batteries are connected with the electrical consumers to supply the electrical consumers with electrical power and by means of which at least one of the at least two batteries is connected to the electrically powered starter to supply the starter with electrical power during a starting process.

The device for supplying voltage to a motor vehicle according to the invention has the advantage that an especially powerful yet reliable and safe voltage supply is made possible for the consumers of an on-board vehicle electrical system. This advantage is attained by operating at least one generator in such a way that it furnishes an rpm-dependent or rpm-independent output voltage. This rpm-dependent output voltage is adapted with the aid of an electronic power control system to the requirements of the on-board electrical system, and this adaptation can be optimized such that the components to be supplied are each supplied with what is the optimally adapted voltage for them. Via the electronic power control system, an optimal power adaptation with regard to a maximum energy yield can be attained in the generator by impedance adaptation.

Further advantages of the invention are attained by the provisions recited in the dependent claims. One of these advantageous provisions is to vary the number of active generator windings by switching the windings or the winding connections and thus to achieve an additional generator adaptation. In a two-battery on-board electrical system with an intermediate circuit and a supply circuit that are each at the same voltage level, the voltages can advantageously be made available to the consumers in the power control unit directly without conversion, that is, without losses, so that an optimal-efficiency distribution is achieved. A consumer- and battery- or storage-specific voltage supply can advantageously be used to realize new functions. Hence it is possible to increase the system efficiency and to improve existing functions. To assure a charge balance or the voltage supply of the most important consumers, that is, those consumers that are absolutely necessary for safe starting and for operation of the vehicle, it is possible depending on the charge state of the storage devices and on the power demand from the consumers and in accordance with prevailing operating points of the generators to use an on-board electrical system management for advantageous current circuit-dependent power production directly in the power control unit and/or in the electronic vehicle body power control system. In the case of a malfunction, the on-board electrical system management can advantageously enable substitute operation via integrated diagnosis and can make for rational maintenance and troubleshooting.

It is also advantageous that for the distribution of the electrical energies, voltage conversion for low power levels, supply reversal of components, and the disposition of the power end stages near the consumers in the on-board electrical system, so-called electronic car body power electronic units (Peus) are used, which lead to simplification in terms of laying cables. For an advantageous feature, the electronic car body power electronic units can also be combined into a single unit.

Guaranteed starting safety is attained by embodying one of the batteries as a starter battery and guaranteeing charging of this battery at the highest priority by means of the on-board electrical system management. If the supply battery used to supply the on-board electrical system consumers is too severely discharged, the starter battery must make the energy available, during starting and in an ensuing emergency operation phase, for all the components relevant to starting. The connection is made with the aid of an electronic car body power electronic unit (PEU) that is equipped with a dual power supply.

BRIEF DESCRIPTION OF THE DRAWING

An exemplary embodiment of the invention is shown in the sole drawing FIGURE and will be described in further detail below.

DESCRIPTION OF THE PREFERRED EMBODIMENT

In the drawing, the components of an on-board vehicle electrical system required for comprehension of the invention, including the on-board electrical system control unit of the invention, are shown. These components include in detail the following: two rotary current generators 10, 11, to which respective winding switching circuits 12, 13 are assigned, whose object or mode of operation will be described in further detail hereinafter. The rotary current generators are connected directly to the power control unit 14. A voltage regulator can additionally be provided for the generators 10 and 11; the two generators 10, 11 may also furnish unregulated, rpm-dependent or rpm-independent output voltages U10, U11. Since these generators are rotary current generators, both generators are connected via three lines each to the power control unit. The power control unit includes one component group, such as a microprocessor 15, known as on-board electrical system management and diagnostics and that controls the entire functional sequence, but which can also be provided, entirely or in part, externally. The power control unit 14 also includes besides the microprocessor 15 for on-board electrical system management and diagnostics, two controlled three-phase bridges 16, 17, and storage means associated with them, such as capacitors 18, 19. The controlled bridges 16, 17 are connected to the three terminals each of the two rotary current generators 10, 11. They rectify the generator output voltages, and the rectified voltages are buffer-stored in the capacitors 18, 19 or capacitor-like storage elements. The triggering of the bridges 16, 17 is effected by means of the microprocessor for on-board electrical system management and diagnostics. This microprocessor can also trigger the capacitors 18, 19 or change their capacitance or trip delete operations.

In the exemplary embodiment of the invention shown in the drawing, triggering connections and information paths are each represented by a thin line. Energy paths over which the supply voltages are carried onward are represented by heavy lines with arrows.

Along with the components already mentioned, the power control unit 14 includes a plurality of direct voltage converters. These DC/DC converters are designated by reference numerals 20, 21, 22, 23 and 24. They communicate with one another over the energy and information paths shown.

The voltage converter 20 as its input voltage receives the rectified but still rpm-independent output voltage U18 of the capacitors 18 and 19. At its output, it furnishes a direct voltage whose magnitude is selected such that the battery 25, which represents the usual on-board battery or supply battery is optimally charged. The magnitude of this voltage UB1 can be adapted to requirements; to that end, for instance with the aid of a temperature sensor 26, the temperature of the battery 25 is measured, and the output voltage of the voltage converter 20 is adjusted as a function of that temperature.

The voltage converters 21–24 have two energy inputs, by way of which on the one hand the rpm-dependent output voltage furnished by the capacitors 18, 19 is delivered, while the voltage of the supply battery 25 is delivered to the other energy input. The direct voltage conversion or of its internal wiring is designed so that at the output of the voltage converter 21, a voltage always appears that is greater than 42 V. The voltage appearing at the output of the voltage converter 22 is 42 V, at the output of the voltage converter 23 is 12 V and at the output of the voltage converter 24 is the voltage UB2, whose magnitude can be selected such that optimal charging of the battery 27, that is, the starter battery, is assured. To that end, the temperature of the battery 27, which is also used to supply the starter 29, measured with a temperature sensor 28 is also taken into account.

The voltages present at the outputs of the voltage converters 21–24 are decoupled from the power control unit 14 via corresponding outputs and are delivered to the various on-board consumers via suitable electronic power control system components. The electronic power control system elements in the exemplary embodiment are constructed in one complete component group (CEU with PEUs) but may also be split; for instance, there may be an independent car body power electronic unit (KLE) in each of the output lines of the voltage converters 21–24.

The consumers of the on-board vehicle electrical system, thus far not identified by reference numeral, are control units whose logic and sensor systems 30 have their own voltage supply, such as 7 V; cosumers 31, 32 relevant for starting and substitute operation, high-power consumers 33 that are to be supplied with 42 V, an example being a disk heater, and a valve 34, such as an injection valve, which has very high dynamic requirements and must be supplied with a voltage of more than 42 V.

Instead of the voltage converter 21, which at its output furnishes a voltage>32 V, a voltage converter may also be used which switches the rpm-dependent output voltage located at the capacitors 18, 19 through without voltage conversion, as long as this voltage is greater than 42 V, and steps up the voltage whenever the voltage applied to the capacitors 18, 19, is below 42 V.

To prevent reverse flows of current, diodes can be used at various points of the individual energy paths; this is true particularly for the input region of the voltage converters 21–24.

Instead of the twin generators shown in the exemplary embodiment, a voltage supply system with a single generator can also be installed; in that case, the components designed by numerals 11, 13, 17 and 19 would be omitted. It is also possible to combine a conventional generator with a voltage regulator with a generator with rpm-proportional voltage.

The rotary current generators 10 and 11 and the associated winding switching circuits 12, 13 and the special regulator interventions involve a special generator design. Typically, rotary current generators have not only the exciter winding but also three stator windings, and the number of windings in the final analysis determines the output voltage furnished. The rotary current generators with winding switching proposed in the exemplary embodiment make it possible, under certain conditions that can be specified in advance, to change the number of actually used windings by switching. Such generators have winding taps that switch, and the switching events are tripped by the power control unit via suitable trigger lines. As will be described in further detail below, a winding switching is effected as a function of the rpm of the generator and as a function of the load adaptation. The generator rotation speed, which is known to be proportional to the rotation speed of the crankshaft of the vehicle engine, is a definitive characteristic variable for the voltage output by the generator. In addition, for power adaptation, the generator impedance can be balanced in stages with the winding switching.

With the device for voltage supply in a motor vehicle shown in the drawing, electrical energy for the various loads in the motor vehicle can be made available. It is possible to generate a higher mean power than in conventional voltage supplies; the buffering of the elevated peak power and higher voltages for realizing its function can be demonstrated. By suitable suitably controlled switching of components relative to starting and substitute operation or operation-relevant components, guaranteed starting safety is attained; the starting-dictated voltage collapse can be averted by decoupling the consumers or by compensation with the DC/DC converters during the starting process. An optimized charge voltage for the batteries can be generated, and thus different consumer-specific voltages can be demonstrated, and expanded utilization of the generators is possible.

As the generator, either one rotary current generator with rpm-proportional output voltage is used, or a plurality of generators are used, in which case one, for instance, furnishes an rpm-proportional output voltage. The generators may furnish direct current or rotary current to the on-board electrical system control unit 14, depending on whether the electronic power control means for the rectification, winding reversal and/or power adaptation of the generators is accommodated in the generator itself or in the power control unit. The generator continues to be operated with the conventional voltage regulator, in order to have an additional adjustment intervention possible in partial-load generator operation. What is essential is that the generator in full-load operation dose not limit the exciter current, but that instead the output voltage rises proportional to the rpm.

The winding switchings that are performed occur in wide voltage stages, with the goal being maximal, optimal-efficiency utilization of the generators. This switching is effected in such a way that at low rotational speed the entire winding, or serially connected windings are utilized for voltage generation. When a predeterminable rotation speed threshold is reached, then by switching of the voltage generation only the residual winding is then used. Proceeding in this way makes possible a generator or winding design that even at 2000 rpm, for instance, leads to a high generator output voltage. After the winding switching, for the same rotation speed, a substantially lesser generator output voltage results, which rises linearly again with increasing rpm.

If a special generator is used, then a switching of the windings can also be done from the delta of a three-phase or delta circuit and as a result a voltage is obtained that is higher by a factor of the square root of 3, compared with the delta circuit. In all cases, the entire on-board electrical system management is performed with the aid of the power control unit 14. Accordingly, the winding switching is initiated from the on-board electrical system control unit. The power control unit moreover controls the adjusting devices for power adaptation that follow the generator, that is, the controlled bridges 16, 17, in such a way that a power adaptation with regard to maximal energy yield takes place at the generator. The controlled impedance adaptation makes possible maximal utilization of the generator, in the form of a power adaptation. For the power adaptation, a load that has the same internal resistance as the generator is specified to the generator via the electronic power control system.

The storage devices 18 and 19 represent an intermediate voltage circuit. They form a short-term storage device with rapid energy takeup and are used for temporary storage. The intermediate circuit, for reasons of efficiency, is connected directly to the voltage converters of the power control unit, which for additional buffering of the supply are also in communication with the supply battery 25. As a result, cascading of voltage converters, which would reduce efficiency, is averted.

The starter battery 27 and the supply battery 25 may be provided with temperature sensors 26, 28, which transmit temperature signals according to the measured temperatures on to the power control unit 14. Charging of both batteries at optimal temperature-dependent voltage is then possible.

In the optimization of the charging process, depending on the type of battery, it is also possible to take account of additional parameters besides the temperatures of the batteries or to measure and/or consider other parameters instead of those temperatures.

The DC/DC voltage converter 21, which is intended to generate the minimum voltage of 42 V from the supply battery, can also be designed such that it furnishes at least 42 V, but switches over to a voltage that rises in proportion to generator rotation speed and/or has such a voltage superimposed, as soon as the voltage arising at the capacitors 18, 19 of the intermediate circuit exceeds 42 V. Proceeding in this way makes it possible to supply rpm-dependent loads directly, without additional losses.

The charge storing means, that is, the batteries, should be designed in terms of their voltage magnitude such that the total system efficiency is as high as possible; that is, among other factors, only a minimum number of voltage conversions is needed, and high-power loads can be supplied directly from the storage devices. It is thus possible to design the voltage converters for medium power levels rather than peak power levels.

The on-board electrical system includes so-called on-board electronic car body power electronic units PEU, which assure the distribution of the supply in the vicinity of the consumers. They contain end stages that have been designed for the power control unit and communicate with a data network, among other elements with the central electronic unit for the car body CEU and the power control unit. The central electronics for the car body and the electronic car body power electronic units PEU can also be embodied as a joint electronic power control system CEU/PEU, as shown in the exemplary embodiment. The PEUs can also include additional voltage converters, for instance for conversion to 7 V.

With the voltage supply device shown in the drawing, one further function can be achieved, which assures the supply to starting and substitute-operation-relevant components 30, 31 when the supply voltage is discharged. To that end, the car body power electronic units, which serve to supply the components 30, 31, relevant to starting and substitute operation, can be connected to the voltage converters 23 and 24, the selection of the optimal connection being made by the power control unit 14. An alternative would be to supply and switch over the starting circuit only using the power control unit or only using the PEU. If the supply battery is largely discharged, the voltage supply can also be done from the starter battery. During the starting process itself, the starter battery 27 is either used only for the starter and not for the supply, in order to avert a voltage drop, or else further internal voltage converters are used, which compensate for the voltage collapse. For the five-volt logic and sensor system 30 and the elements relative to safety and/or operation, a voltage of 7 V can be furnished by a further converter in the CEU/PEU.

The power control unit and the car body power electronic units can be designed in arbitrary form, for instance as logic ASICs, microprocessors, and/or the like. Other additional embodiments are possible. The data network may also be coupled with other data networks, for instance to the engine control unit.

We claim:

1. A device for supplying voltage in a motor vehicle, said device comprising at least one generator (10,11) having a generator speed and including means for producing at least one generator-speed dependent output voltage;

at least two batteries (25,27);

a plurality of electrical consumers (32a,32b,33,34);

an electrically powered starter (29);

a power control unit (14) for operating said at least one generator (10,11) without voltage regulation to produce the at least one-generator-speed dependent output voltage including controlled rectifier bridge means (16,17) connected to said at least one generator (10,11), a following intermediate voltage circuit (18,19) connected to said controlled rectifier bridge means (16,17), means (15) for controlling said at least one generator, said controlled rectifier bridge means and said intermediate voltage circuit and a plurality terminals by means of which the at least two batteries (25,27) are connected with the electrical consumers to supply the electrical consumers with electrical power and at least one of said at least two batteries is connected to the electrically powered starter to supply the starter (29) with electrical power during a starting process.

2. The device as defined in claim 1, wherein said at least one generator (10,11) consists of a three-phase alternator including a plurality of stator windings each having a predetermined winding length or winding voltage and said power control unit (14) includes means for switching said stator windings so that said at least one generator speed-dependent output voltage varies according to a sum total of the winding lengths of the windings that are energized by the switching or a sum total of the winding voltages of the windings that are energized by the switching.

3. The device as defined in claim 2, wherein said means for switching said stator windings switches said stator windings to change said sum total according to a generator speed between a maximum value and a minimum value of the generator speed and performs at least one switching operation at a predetermined generator speed.

4. The device as defined in claim 1, wherein the power control unit (14) includes a plurality of voltage converters (21,22,23,24) connected to the intermediate voltage circuit for producing different output voltages connected in parallel to each other and further comprising a central electronic unit (35) for distributing electrical power to said electrical consumers, said central electronic unit (35) being electrically connected to said voltage converters and said consumers.

5. The device as defined in claim 4, where the power control unit (14) includes at least one additional voltage converter (20) electrically connected directly with one (25) of said at least two batteries.

6. The device as defined in claim 1, further comprising means (26,28) for measuring a temperature of each of said at least two batteries (25,27), and wherein the power control unit (14) includes means for providing and regulating a charging voltage of one of said at least two batteries according to said temperature of said one of said batteries during charging of said one of said at least two batteries.

7. The device as defined in claim 1, wherein the batteries (25,27) include one (25) connected to the starter by the power control unit (14) and another (27) connected directly across the starter (29) and the power control unit (14) includes switchable or controllable means for electrically connecting and disconnecting both (25,27) of said at least two batteries to starting and substitute operation-relevant components so that said starter (29) is connected to said another (27) of said at least two batteries only when said one (25) of said at least two batteries has a poorly charged state.

8. The device as defined in claim 7, wherein said another (27) of said at least two batteries is charged with maximum priority by said power control unit (14).

* * * * *